(12) United States Patent
Song et al.

(10) Patent No.: US 8,373,833 B2
(45) Date of Patent: Feb. 12, 2013

(54) ARRAY SUBSTRATE FOR FRINGE FIELD SWITCHING MODE LIQUID CRYSTAL DISPLAY DEVICE AND FRINGE FIELD SWITCHING MODE LIQUID CRYSTAL DISPLAY DEVICE INCLUDING THE SAME

(75) Inventors: Sang-Moo Song, Daegu (KR); In-Ho Hwang, Seoul (KR); Dae-Lim Park, Gyeongbuk (KR); Ki-Hyun Lyu, Gyeonggi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/410,529

(22) Filed: Mar. 2, 2012

(65) Prior Publication Data
US 2012/0218488 A1    Aug. 30, 2012

Related U.S. Application Data

(62) Division of application No. 12/318,271, filed on Dec. 23, 2008, now Pat. No. 8,154,696.

(30) Foreign Application Priority Data

Jun. 25, 2008 (KR) .......................... 10-2008-0060328
Aug. 25, 2008 (KR) .......................... 10-2008-0082964

(51) Int. Cl.
*G02F 1/1343* (2006.01)
(52) U.S. Cl. ........................................ 349/141; 349/139
(58) Field of Classification Search ............... 349/141
See application file for complete search history.

(56) References Cited

U.S. PATENT DOCUMENTS

| 7,663,724 B2* | 2/2010 | Lim et al. .................. 349/141 |
| 8,134,674 B2* | 3/2012 | Lim et al. .................. 349/142 |
| 2001/0001567 A1 | 5/2001 | Lyu et al. |
| 2001/0046027 A1 | 11/2001 | Tai et al. |
| 2007/0177090 A1 | 8/2007 | Shimomaki |
| 2007/0195250 A1 | 8/2007 | Onogi et al. |
| 2007/0229750 A1 | 10/2007 | Matsuda et al. |
| 2008/0186440 A1 | 8/2008 | Lim et al. |
| 2008/0266479 A1 | 10/2008 | Lim |

FOREIGN PATENT DOCUMENTS

| JP | 2001083540 | 3/2001 |
| JP | 2007-233317 | 9/2007 |
| JP | 2007293155 | 11/2007 |
| JP | 2008191669 | 8/2008 |
| KR | 10-2002-0085237 | 11/2002 |
| KR | 20070085148 | 8/2007 |
| WO | 2007088644 | 8/2007 |

\* cited by examiner

*Primary Examiner* — Rhonda Peace
(74) *Attorney, Agent, or Firm* — Morgan, Lewis & Bockius LLP

(57) ABSTRACT

An array substrate for a fringe field switching mode liquid crystal display device includes a plurality of gate lines on a substrate; a gate insulating layer on the plurality of gate lines; a plurality of data lines crossing the plurality of gate lines to define a plurality of pixel regions; a thin film transistor electrically connected to the gate and data lines in each pixel region; a pixel electrode having a plate shape in each pixel region, and connected to a portion of the thin film transistor; a first passivation layer on the pixel electrode and over the thin film transistor; and a common electrode on the first passivation layer and having a plurality of openings of a bar shape in each pixel region, wherein a center portion of each opening overlaps the pixel electrode, and both ends along a major axis of each opening protrude beyond the pixel electrode.

6 Claims, 12 Drawing Sheets

ARRAY SUBSTRATE FOR FRINGE FIELD SWITCHING MODE LIQUID CRYSTAL DISPLAY DEVICE AND FRINGE FIELD SWITCHING MODE LIQUID CRYSTAL DISPLAY DEVICE INCLUDING THE SAME

This application is a divisional application of application Ser. No. 12/318,271, filed on Dec. 23, 2008 now U.S. Pat. No. 8,154,696, which claims the benefit of Korean Patent Application Nos. 10-2008-0060328 and 10-2008-0082964, filed in Korea on Jun. 25, 2008 and Aug. 25, 2008, respectively, all of which are hereby incorporated by reference in their entirety.

BACKGROUND OF THE INVENTION

1. Field of the Invention

The present invention relates to a fringe field switching (FFS) mode liquid crystal display (LCD) device, and more particularly, to an array substrate for an FFS mode LCD device capable of improving transmittance and aperture ratio and an FFS mode LCD device including the array substrate. The FFS mode LCD device can display a high quality image.

2. Discussion of the Related Art

A related art liquid crystal display (LCD) device uses optical anisotropy and polarization properties of liquid crystal molecules. The liquid crystal molecules have a definite alignment direction as a result of their thin and long shapes. The alignment direction of the liquid crystal molecules can be controlled by application of an electric field across the liquid crystal molecules. As the intensity or direction of the electric field is changed, the alignment of the liquid crystal molecules also changes. Since incident light is refracted based on the orientation of the liquid crystal molecules due to the optical anisotropy of the liquid crystal molecules, images can be displayed by controlling light transmissivity.

Since the LCD device including a thin film transistor (TFT) as a switching element, referred to as an active matrix LCD (AM-LCD) device, has excellent characteristics such as high resolution and display of moving images, the AM-LCD device has been widely used.

The AM-LCD device includes an array substrate, a color filter substrate and a liquid crystal layer interposed therebetween. The array substrate may include a pixel electrode and TFT, and the color filter substrate may include a color filter layer and a common electrode. The AM-LCD device is driven by an electric field between the pixel electrode and the common electrode resulting in excellent properties of transmittance and aperture ratio. However, since the AM-LCD device uses a vertical electric field, the AM-LCD device has a bad viewing angle.

An in-plane switching (IPS) mode LCD device may be used to resolve the above-mentioned limitations. FIG. 1 is a cross-sectional view of the related art IPS mode LCD device. As shown in FIG. 1, the array substrate and the color filter substrate are separated and face each other. The array substrate includes a first substrate 10, a common electrode 17 and a pixel electrode 30. Though not shown, the array substrate may include a TFT, a gate line, a data line, for example. The color filter substrate includes a second substrate 9, a color filter layer (not shown), for example. A liquid crystal layer 11 is interposed between the first substrate 10 and the second substrate 9. Since the common electrode 17 and the pixel electrode are formed on the first substrate 10 on the same level, a horizontal electric field "L" is generated between the common and pixel electrodes 17 and 30.

FIGS. 2A and 2B are cross-sectional views showing turned on/off conditions of the related art IPS mode LCD device. As shown in FIG. 2A, when the voltage is applied to the IPS mode LCD device, liquid crystal molecules 11a above the common electrode 17 and the pixel electrode 30 are unchanged. But, liquid crystal molecules 11b between the common electrode 17 and the pixel electrode 30 are horizontally arranged due to the horizontal electric field "L". Since the liquid crystal molecules are arranged by the horizontal electric field, the IPS mode LCD device has a characteristic of a wide viewing angle. FIG. 2B shows a condition when the voltage is not applied to the IPS mode LCD device. Because an electric field is not generated between the common and pixel electrodes 17 and 30, the arrangement of liquid crystal molecules 11 is not changed. However, the IPS mode LCD device has poor aperture ratio and transmittance.

A fringe field switching (FFS) mode LCD device has been introduced to resolve the above-mentioned limitations. In the FFS mode LCD device, the liquid crystal molecules are driven by a fringe field.

FIG. 3 is a plan view of an array substrate for the related art FFS mode LCD device. As shown in FIG. 3, an array substrate includes a substrate 41, a gate line 43, a data line 51, a thin film transistor (TFT) "Tr", a common electrode 75 and a pixel electrode 60. The gate line 43 and the data line 51 are formed on the substrate 41 and cross each other to define a pixel region "P". The gate line 43 is insulated from the data line 51 due to a gate insulating layer (not shown). The TFT "Tr" is formed in each pixel region "P" and connected to the gate and data lines 43 and 51. The TFT "Tr" includes a gate electrode 45, the gate insulating layer, a semiconductor layer (not shown), a source electrode 55 and a drain electrode 58. The gate electrode 45 is connected to the gate line 43, and the source electrode 55 is connected to the data line 51.

The pixel electrode 60 is formed in each pixel region "P". The pixel electrode 60 is electrically connected to the drain electrode 58 of the TFT "Tr" through a drain contact hole 59. The pixel electrode 60 has a plate shape and includes a plurality of openings "op". Each of the openings "op" has a bar shape. In addition, the common electrode 75 having a plate shape is formed on an entire surface of a display region of the substrate 41. The common electrode 75 overlaps the pixel electrode 60. Although the common electrode 75 is formed on an entire surface of the display region of the substrate 41, the common electrode 75 corresponding to one pixel region "P" is marked by a dot-line.

In the array substrate for the FFS mode LCD device having the above structure, when voltages are applied to the common electrode 75 and the pixel electrodes 60, a fringe field is induced between the pixel and common electrodes 60 and 75.

In the above array substrate for the FFS mode LCD device, the openings "op" of the pixel electrode 60 perfectly overlaps the common electrode 75. In this case, an uniform electric field is not generated at both end portions of the opening "op" along a major axis of the opening "op". The end portions, where non-uniform electric field is generated, may be referred to as a disclination area "DA". Namely, the liquid crystal molecules in the disclination area "DA" have non-uniform arrangements. Since the FFS mode LCD device has a less transmittance in the disclination area "DA" than other areas with an ON state, there are dark images in the disclination area "DA", as shown in FIG. 4 showing a picture showing a pixel region of an array substrate for the related art FFS mode LCD device.

The FFS mode LCD device has a decrease of transmittance and displaying quality due to the disclination area.

FIG. 5 is a plan view of the related art FFS mode LCD device. As shown in FIG. 5, the FFS mode LCD device 40 includes a first substrate 42, a second substrate (not shown) and a liquid crystal layer (not shown) interposed therebetween.

On the first substrate 42, a gate line 44, a data line 52, a thin film transistor (TFT) "Tr", a common electrode 76 and a pixel electrode 61 are formed. The gate line 44 and the data line 52 are formed on the first substrate 42 and cross each other to define a pixel region "P". The gate line 44 is insulated from the data line 52 due to a gate insulating layer (not shown). The TFT "Tr" is formed in each pixel region "P" and connected to the gate and data lines 44 and 52. The TFT "Tr" includes a gate electrode 46, the gate insulating layer, a semiconductor layer (not shown), a source electrode 56 and a drain electrode 59. The gate electrode 46 is connected to the gate line 44, and the source electrode 56 is connected to the data line 52.

The pixel electrode 61 is formed in each pixel region "P". The pixel electrode 61 is electrically connected to the drain electrode 59 of the TFT "Tr". The pixel electrode 61 has a plate shape and includes a plurality of openings "op". Each of the openings "op" has a bar shape. The pixel electrode 61 is disposed inside of the pixel region "P". Namely, the pixel electrode 61 does not overlap the gate and data lines 44 and 52 and is spaced apart from the gate and data lines 44 and 52 by a predetermined distance. The reason why the pixel electrode does not overlap the gate and data lines 44 and 52 is that there is a parasitic capacitance between the gate line 44 the pixel electrode 61 and between the data line 52 and the pixel electrode 61 such that a distortion in an electrical field is generated when the pixel electrode overlaps the gate and data lines 44 and 52 with the gate insulating layer (not shown) therebetween. Accordingly, to prevent these problems, the pixel electrode does not overlap the gate and data lines 44 and 52.

In addition, the common electrode 76 having a plate shape is formed on an entire surface of a display region of the first substrate 42. The common electrode 76 overlaps the pixel electrode 61. Although the common electrode 76 is formed on an entire surface of the display region of the first substrate 42, the common electrode 76 corresponding to one pixel region "P" is marked by a dot-line. The first substrate 42, where the gate line 44, the data line 52, the TFT "Tr", the pixel electrode 61 and the common electrode 76 are formed, may be referred to as an array substrate.

In the array substrate for the FFS mode LCD device having the above structure, when voltages are applied to the common electrode 76 and the pixel electrodes 61, a fringe field is induced between the pixel and common electrodes 61 and 76.

On the second substrate (not shown) facing the first substrate 42, a color filter layer (not shown) and a black matrix 85 are formed. The color filter layer includes color filter patterns of red, green and blue colors. The color filter patterns correspond to the pixel region "P". The black matrix 85 is disposed to correspond to boundaries of the pixel region "P". Namely, the black matrix 85 corresponds to the gate line 44, the data line 52 and the TFT "Tr".

In the above array substrate for the FFS mode LCD device, the openings "op" of the pixel electrode 60 perfectly overlaps the common electrode 75. In this case, an uniform electric field is not generated at both end portions of the opening "op" along a major axis of the opening "op". The end portions, where non-uniform electric field is generated, may be referred to as a disclination area "DA". Namely, the liquid crystal molecules in the disclination area "DA" have non-uniform arrangements. Since the FFS mode LCD device has a less transmittance in the disclination area "DA" than other areas with an ON state, there are dark images in the disclination area "DA".

Since light is abnormally transmitted in the disclination area "DA", there is a decrease of displaying quality. Accordingly, the black matrix 85 extends to shield the disclination area "DA". When the black matrix 85 has wider area, there is a decrease in aperture ratio and transmittance.

SUMMARY OF THE INVENTION

Accordingly, the present invention is directed to an array substrate for an FFS mode LCD device and an FFS mode LCD device including the same that substantially obviate one or more of the problems due to limitations and disadvantages of the related art.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, an array substrate for a fringe field switching mode liquid crystal display device includes a plurality of gate lines on a substrate; a gate insulating layer on the plurality of gate lines; a plurality of data lines on the gate insulating layer and crossing the plurality of gate lines to define a plurality of pixel regions; a thin film transistor electrically connected to the gate and data lines and in each pixel region; a pixel electrode having a plate shape and in the each pixel region, the pixel electrode connected to a portion of the thin film transistor; a first passivation layer on the pixel electrode and over the thin film transistor; and a common electrode on the first passivation layer and having a plurality of openings of a bar shape in the each pixel region, each of the openings having a major axis along the data line and a minor axis along the gate line, wherein a center portion of each opening overlaps the pixel electrode, and both ends along the major axis of each opening protrude beyond the pixel electrode.

In another aspect of the present invention, an array substrate for a fringe field switching mode liquid crystal display device includes a plurality of gate lines on a substrate; a gate insulating layer on the plurality of gate lines; a plurality of data lines on the gate insulating layer and crossing the plurality of gate lines to define a plurality of pixel regions; a thin film transistor electrically connected to the gate and data lines and in each pixel region; a pixel electrode having a plate shape and in the each pixel region, the pixel electrode connected to a portion of the thin film transistor; a passivation layer on the pixel electrode and over the thin film transistor; and a common electrode on the passivation layer and having a plurality of openings of a bar shape in the each pixel region, each of the openings having a major axis along the data line and a minor axis along the gate line, wherein a center portion of each opening overlaps the pixel electrode, and an end along the minor axis of an outermost opening of the plurality of openings protrudes beyond the pixel electrode.

In another aspect of the present invention, an array substrate for a fringe field switching mode liquid crystal display device includes a plurality of gate lines on a substrate; a gate insulating layer on the plurality of gate lines; a plurality of data lines on the gate insulating layer and crossing the plurality of gate lines to define a plurality of pixel regions; a thin film transistor electrically connected to the gate and data lines and in each pixel region; a pixel electrode having a plate shape and in the each pixel region, the pixel electrode connected to a portion of the thin film transistor and overlapping a portion of the gate line; a passivation layer on the pixel electrode and over the thin film transistor; and a common electrode on the passivation layer and having a plurality of openings of a bar shape in the each pixel region, each of the openings having a major axis along the data line and a minor axis along the gate line, wherein a center portion of each opening overlaps the pixel electrode, and both ends along the major axis of each opening overlap the gate line.

In another aspect of the present invention, an array substrate for a fringe field switching mode liquid crystal display device includes a plurality of gate lines on a substrate; a gate insulating layer on the plurality of gate lines; a plurality of data lines on the gate insulating layer and crossing the plurality of gate lines to define a plurality of pixel regions; a thin film transistor electrically connected to the gate and data lines and in each pixel region; a pixel electrode having a plate shape and in the each pixel region, the pixel electrode connected to a portion of the thin film transistor and overlapping a portion of the gate line; a passivation layer on the pixel electrode and over the thin film transistor; and a common electrode on the passivation layer and having a plurality of openings of a bar shape in the each pixel region, each of the openings running across through the pixel regions along each data line.

In another aspect of the present invention, a fringe field switching mode liquid crystal display device includes first and second substrate facing each other; a plurality of gate lines on the first substrate; a gate insulating layer on the plurality of gate lines; a plurality of data lines on the gate insulating layer and crossing the plurality of gate lines to define a plurality of pixel regions; a thin film transistor electrically connected to the gate and data lines and in each pixel region; a pixel electrode having a plate shape and in the each pixel region, the pixel electrode connected to a portion of the thin film transistor; a passivation layer on the pixel electrode and over the thin film transistor; a common electrode on the passivation layer and having a plurality of openings of a bar shape in the each pixel region, each of the openings having a major axis along the data line and a minor axis along the gate line, wherein a center portion of each opening overlaps the pixel electrode, and both ends along the major axis of each opening protrude beyond the pixel electrode; a black matrix on the second substrate and surrounding the each pixel region; a color filter layer on the second substrate and corresponding to the each pixel region; and a liquid crystal layer between the first and second substrates.

In another aspect of the present invention, a fringe field switching mode liquid crystal display device includes first and second substrate facing each other; a plurality of gate lines on the first substrate; a gate insulating layer on the plurality of gate lines; a plurality of data lines on the gate insulating layer and crossing the plurality of gate lines to define a plurality of pixel regions; a thin film transistor electrically connected to the gate and data lines and in each pixel region; a pixel electrode having a plate shape and in the each pixel region, the pixel electrode connected to a portion of the thin film transistor; a passivation layer on the pixel electrode and over the thin film transistor; a common electrode on the passivation layer and having a plurality of openings of a bar shape in the each pixel region, each of the openings having a major axis along the data line and a minor axis along the gate line, wherein a center portion of each opening overlaps the pixel electrode, and an end along the minor axis of an outermost opening of the plurality of openings protrudes beyond the pixel electrode; a black matrix on the second substrate and surrounding the each pixel region; a color filter layer on the second substrate and corresponding to the each pixel region; and a liquid crystal layer between the first and second substrates.

In another aspect of the present invention, a fringe field switching mode liquid crystal display device includes first and second substrate facing each other; a plurality of gate lines on the first substrate; a gate insulating layer on the plurality of gate lines; a plurality of data lines on the gate insulating layer and crossing the plurality of gate lines to define a plurality of pixel regions; a thin film transistor electrically connected to the gate and data lines and in each pixel region; a pixel electrode having a plate shape and in the each pixel region, the pixel electrode connected to a portion of the thin film transistor and overlapping a portion of the gate line; a passivation layer on the pixel electrode and over the thin film transistor; a common electrode on the first passivation layer and having a plurality of openings of a bar shape in the each pixel region, each of the openings having a major axis along the data line and a minor axis along the gate line, wherein a center portion of each opening overlaps the pixel electrode, and both ends along the major axis of each opening overlap the gate line; a black matrix on the second substrate and shielding the data lines and the thin film transistor except the gate lines; a color filter layer on the second substrate and corresponding to the each pixel region; and a liquid crystal layer between the first and second substrates.

In another aspect of the present invention, a fringe field switching mode liquid crystal display device includes first and second substrate facing each other; a plurality of gate lines on the first substrate; a gate insulating layer on the plurality of gate lines; a plurality of data lines on the gate insulating layer and crossing the plurality of gate lines to define a plurality of pixel regions; a thin film transistor electrically connected to the gate and data lines and in each pixel region; a pixel electrode having a plate shape and in the each pixel region, the pixel electrode connected to a portion of the thin film transistor and overlapping a portion of the gate line; a passivation layer on the pixel electrode and over the thin film transistor; a common electrode on the first passivation layer and having a plurality of openings of a bar shape in the each pixel region, each of the openings running across through the pixel regions along each data line; a black matrix on the second substrate and shielding the data lines and the thin film transistor except the gate lines; a color filter layer on the second substrate and corresponding to the each pixel region; and a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the preferred embodiments, examples of which are illustrated in the accompanying drawings.

Figure 6:
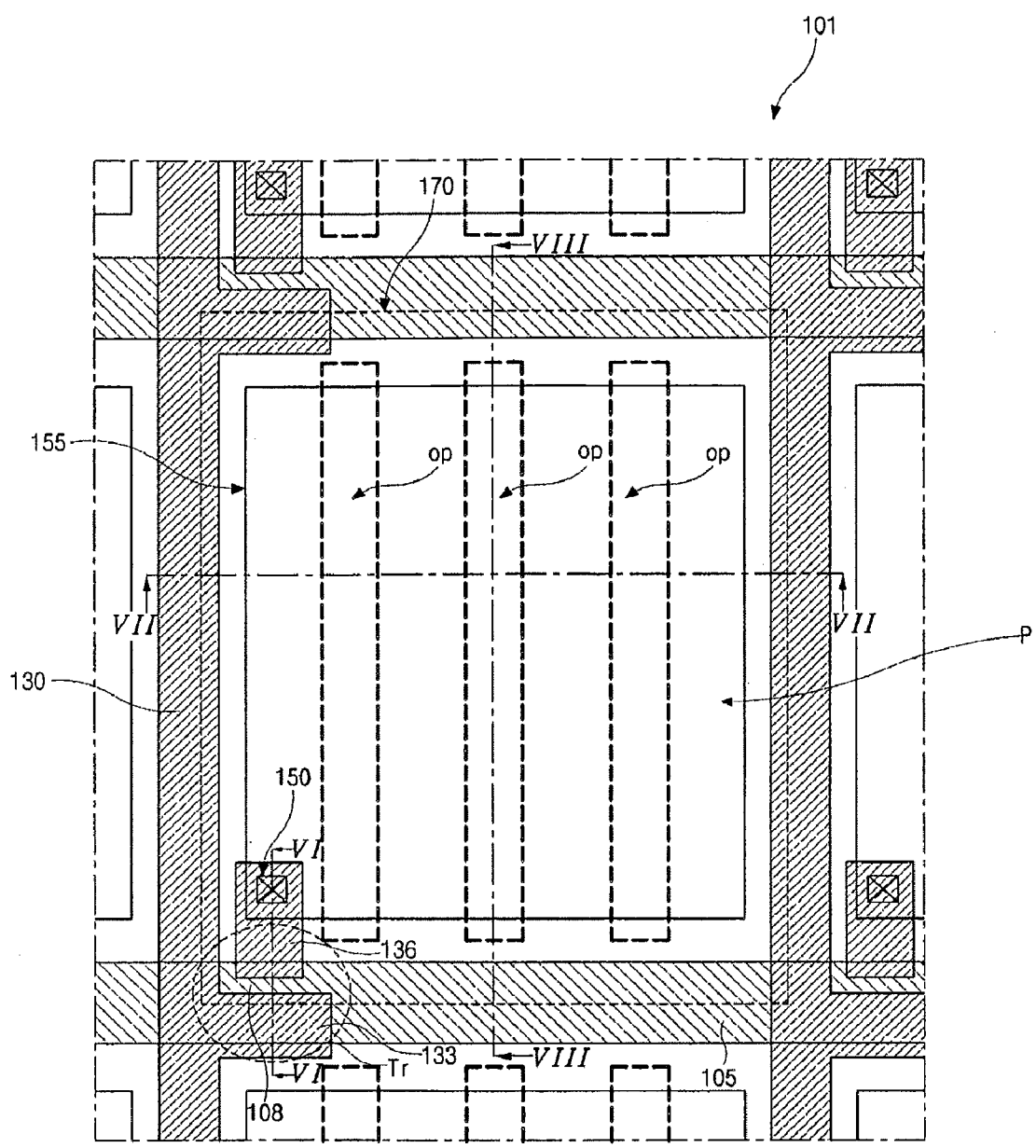
FIG. 6 is a plan view of an array substrate for an FFS mode LCD device according to a first embodiment of the present invention.
Figure 7:
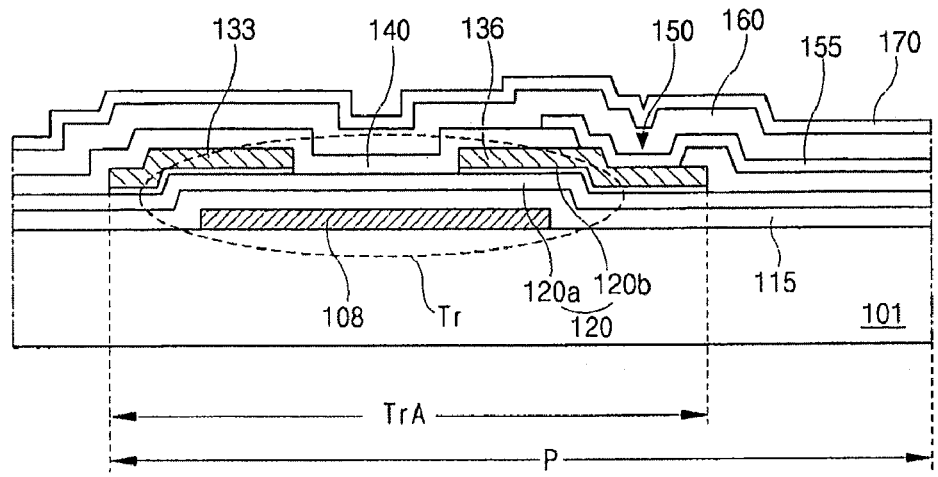
FIG. 7 is a cross-sectional view taken along the line VI-VI of FIG. 6.
Figure 8:
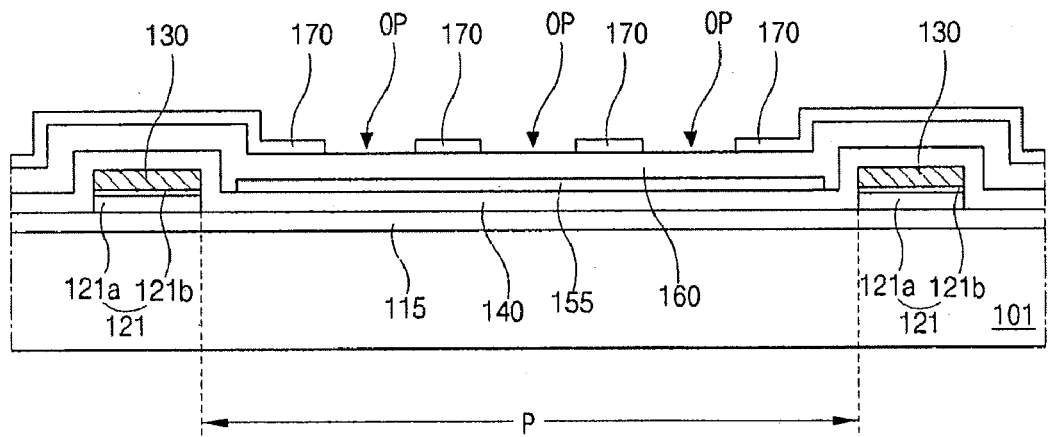
FIG. 8 is a cross-sectional view taken along the line VII-VII of FIG. 6.
Figure 9:
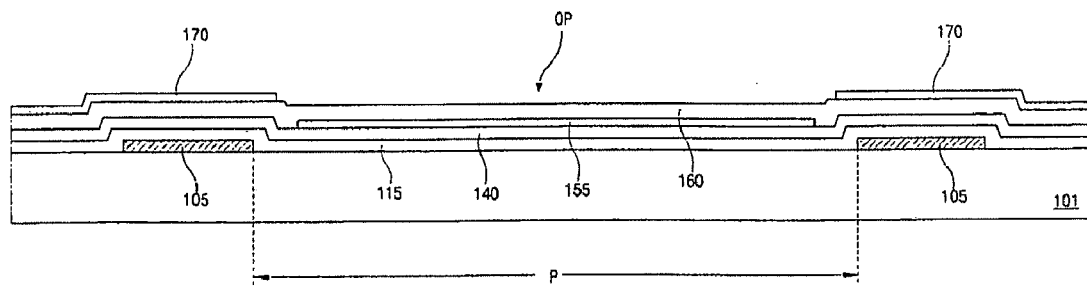
FIG. 9 is a cross-sectional view taken along the line VIII-VIII of FIG. 6.

FIG. 6 is a plan view of an array substrate for an FFS mode LCD device according to a first embodiment of the present invention, and FIG. 7 is a cross-sectional view taken along the line VI-VI of FIG. 6. FIG. 8 is a cross-sectional view taken along the line VII-VII of FIG. 6, and FIG. 9 is a cross-sectional view taken along the line VIII-VIII of FIG. 6. A display region, where a plurality of pixel region are formed, a non-display region, where a pad region is formed, and a switching region, where a TFT as a switching element is formed, are respectively defined on the array substrate. The non-display region is disposed at a periphery of the display region, and the switching region is disposed in the pixel region.

Figure 5:
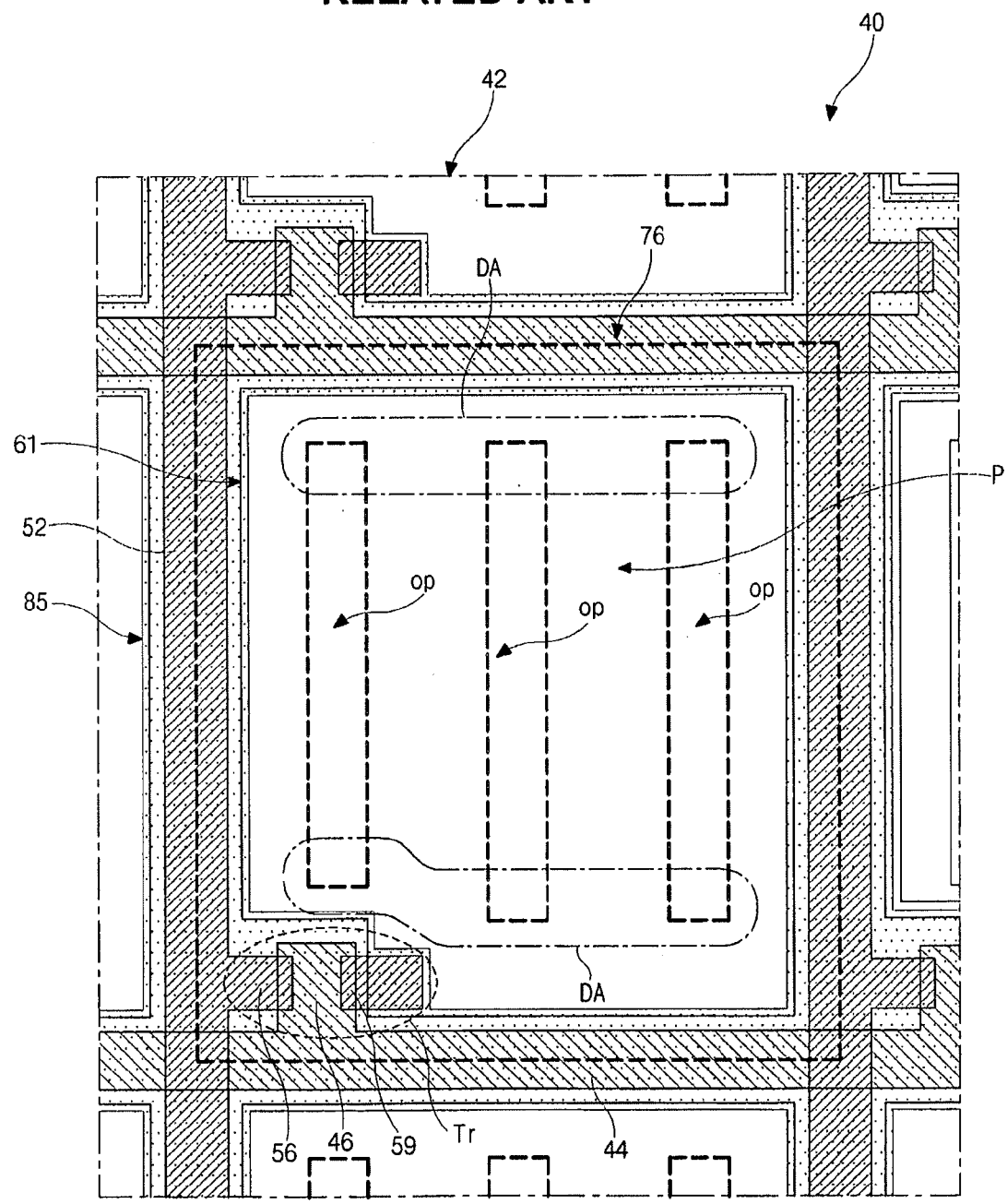
FIG. 5 is a plan view of the related art FFS mode LCD device.

In FIG. 5, a gate line 105 is formed on a substrate 101 along a first direction. A data line 130 along a second direction crosses the gate line 105 such that a pixel region "P" is defined.

In the pixel region "P", a TFT "Tr" connected to the gate and data lines 105 and 130 is formed. The TFT "Tr" includes a gate electrode 108, a gate insulating layer (not shown), a semiconductor layer (not shown) including an active layer (not shown) of intrinsic amorphous silicon and an ohmic contact layer (not shown) of impurity-doped amorphous silicon, a source electrode 133 and a drain electrode 136. The source electrode 133 is spaced apart from the drain electrode 136. In FIG. 5, to improve aperture ratio, the gate electrode 108 is a portion of the gate line 105 such that the TFT "Tr" is formed on the gate line 105. However, the gate electrode 105 may protrude from the gate line 105 into the pixel region "P".

A pixel electrode 155 having a plate shape is disposed in the pixel region "P". The pixel electrode 155 is connected to the drain electrode 136 of the TFT "Tr" through the drain contact hole 150. In addition, a common electrode 170 having a plurality of openings "op" is formed on an entire surface of the display region. Each of the openings "op" has a bar shape. The common electrode 170 corresponding to one pixel region "P" is marked by a dot-line.

The openings "op" is positioned in the pixel region "P" to overlap the pixel electrode 155. Each opening "op" has a major axis along the data line 130 and a minor axis along the gate line 105. A center portion of the opening "op" overlaps the pixel electrode 155, while both ends along the major axis of the opening "op" protrude beyond the pixel electrode 155. Namely, the both ends along the major axis of the opening "op" are shown to be positioned outside of the pixel electrode 155, and other portions of the opening "op" are shown to be positioned inside of the pixel electrode 155. Each opening "op" of the common electrode 170 has a major length greater than the pixel electrode 155 such that the both ends of the opening "op" along the major axis do not overlap the pixel electrode 155. To the above structure, the openings should be formed on the common electrode, not the pixel electrode. The common electrode 170 covers the TFT "Tr" in FIG. 6. However, a portion of the common electrode 170 corresponding to the TFT "Tr" may be removed such that a portion of the second passivation layer 160 is exposed.

Figure 1:
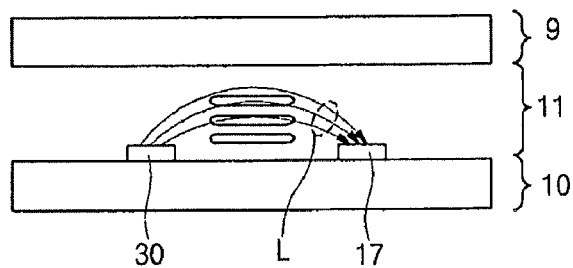
FIG. 1 is a cross-sectional view of the related art IPS mode LCD device.
Figure 2A:
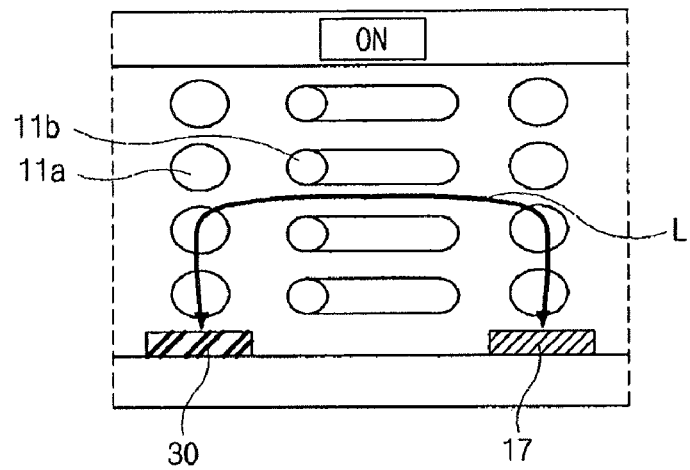
FIGS. 2A and 2B are cross-sectional views showing turned on/off conditions of the related art IPS mode LCD device.
Figure 2B:
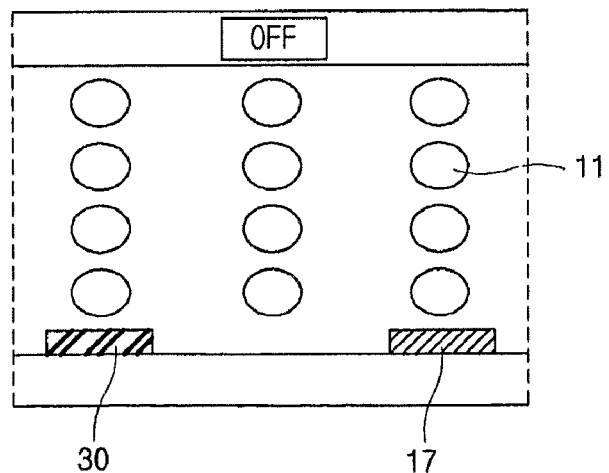
Figure 3:
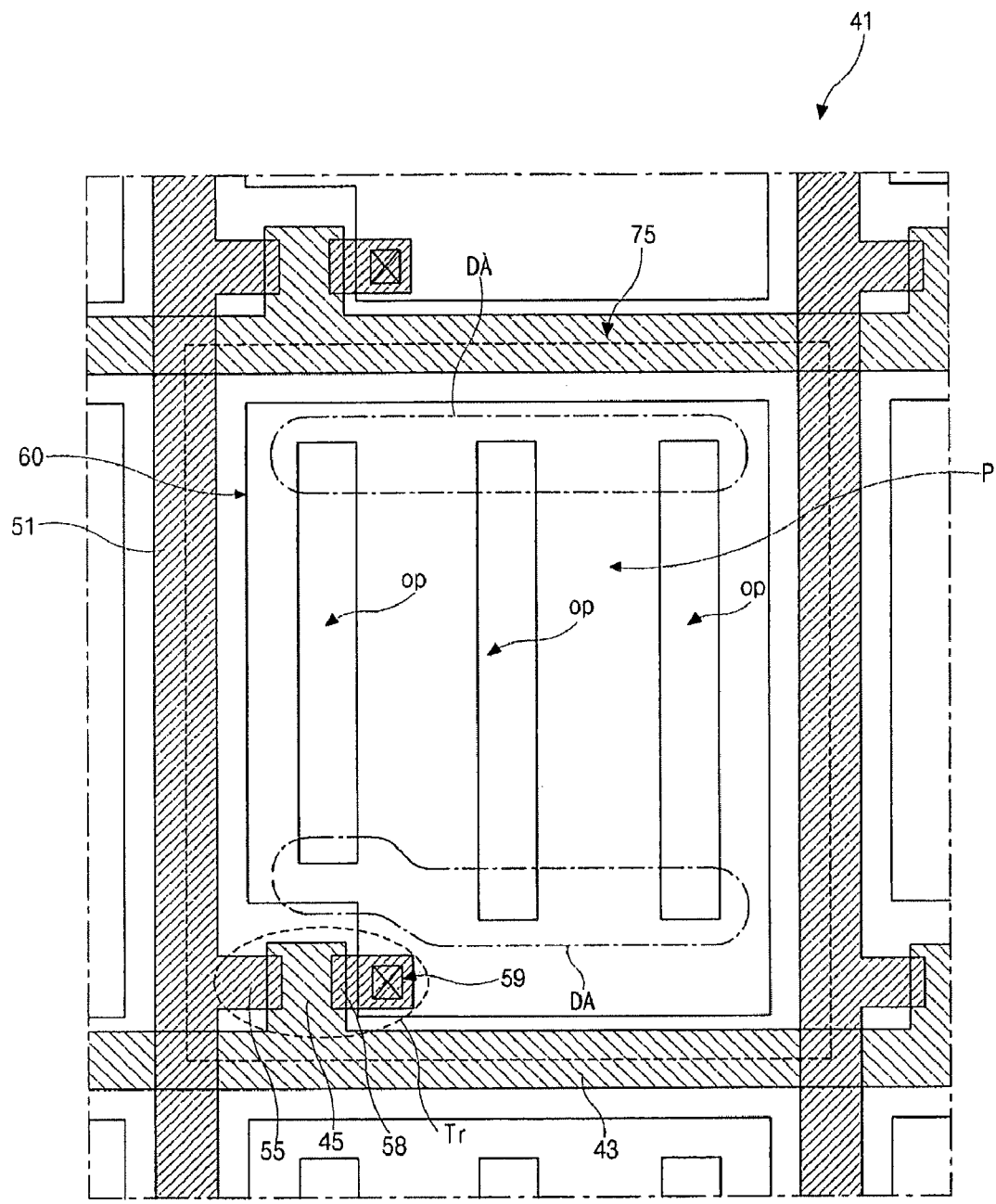
FIG. 3 is a plan view of an array substrate for the related art FFS mode LCD device.
Figure 4:
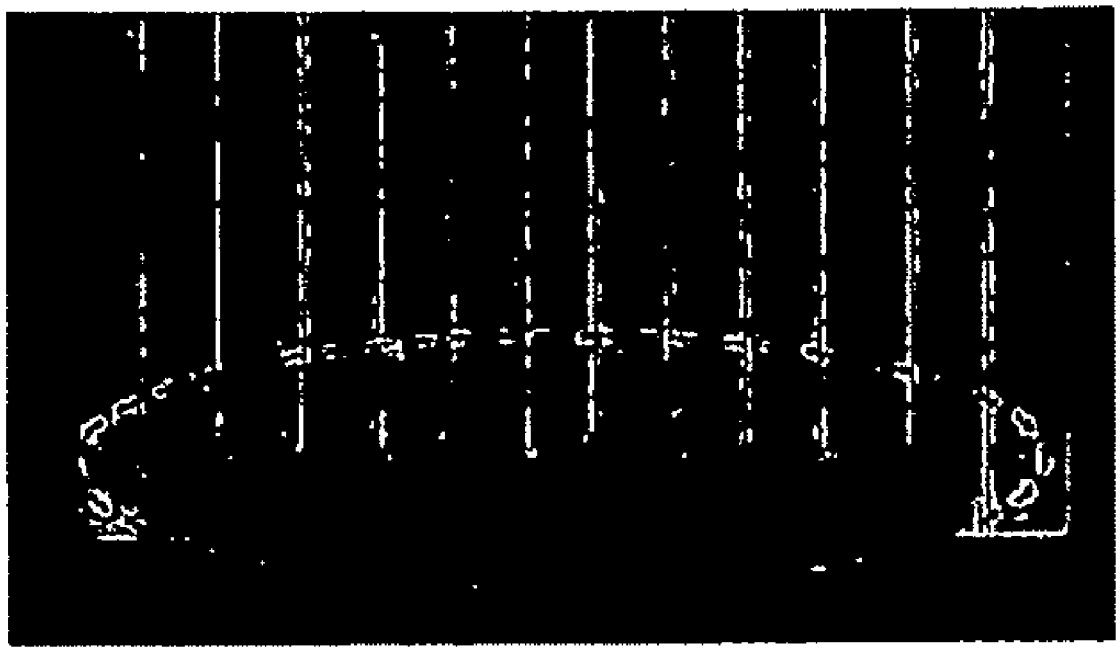
FIG. 4 shows a picture showing a pixel region of an array substrate for the related art FFS mode LCD device

In the both ends of the opening "op" along the major axis, an electric field is not generated or is very weak at a minor side surface of the opening "op". Liquid crystal molecules at the both ends of the opening "op" along the major axis are driven by an electric field generated at a major side surface of the opening "op" to have an uniform arrangement. As a result, the disclination area "DA" (of FIG. 3) show in the related art FFS mode LCD device may be not generated in the FFS mode LCD device according to the present invention. Or, even if there is the disclination area in the FFS mode LCD device, there is no decrease in aperture ratio because the disclination area overlaps the gate line 105. Accordingly, the FFS mode LCD device has improved aperture ratio and transmittance.

Figure 10:
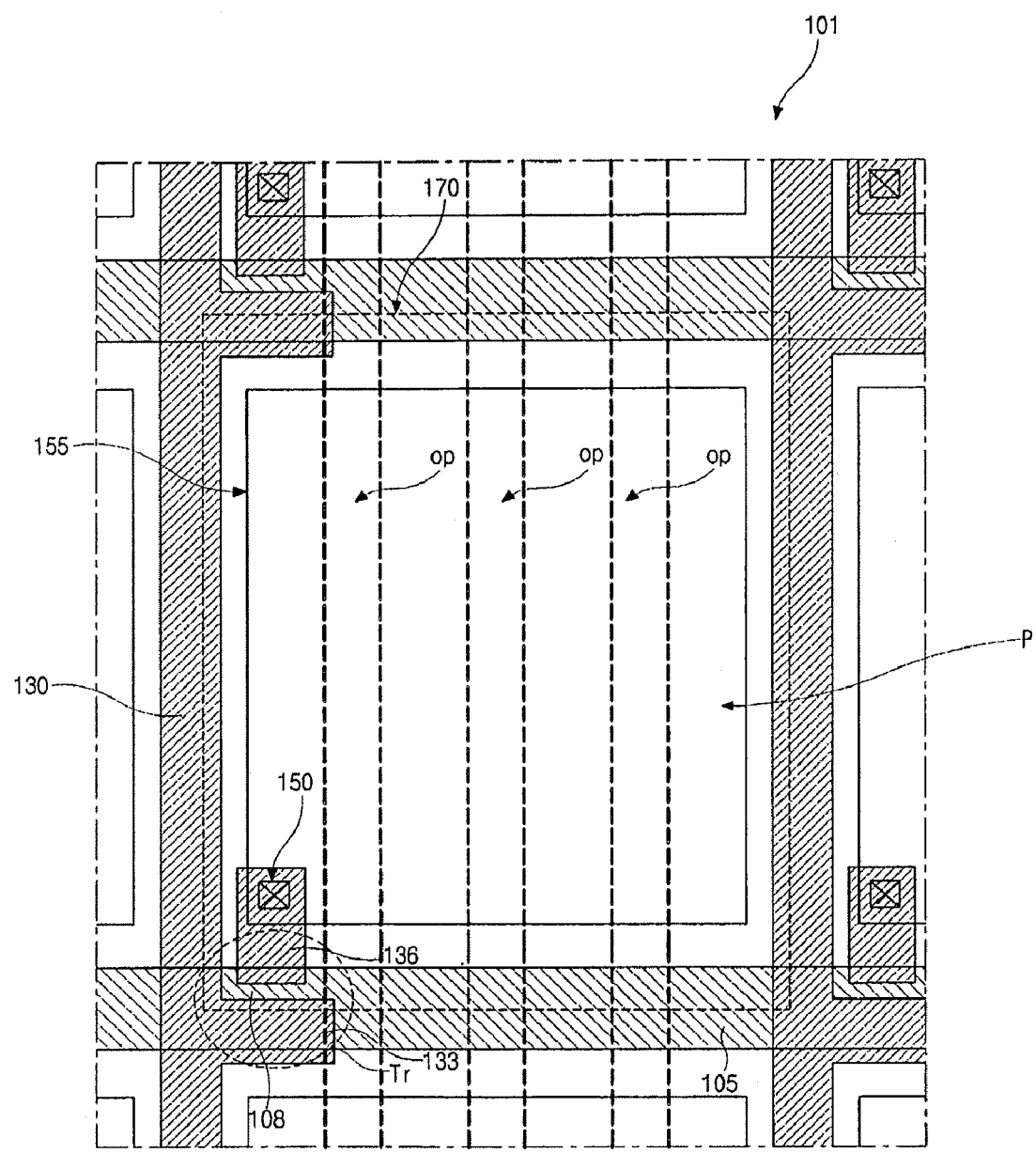
FIG. 10 is a plan view of an array substrate for an FFS mode LCD device according to a modified embodiment of the first embodiment of the present invention.

Referring to FIG. 10, which is a plan view of an array substrate for an FFS mode LCD device according to a modified embodiment of the first embodiment of the present invention, openings "op" in pixel regions adjacent to each other along the data line 130 are connected to each other. Namely, the openings "op" in pixel regions adjacent to each other along the data line 130 runs across the gate line 105. The openings "op" are formed throughout the pixel regions "P" arranged along the single data line 130 and a single stripe shape. The FFS mode LCD device according to the modified embodiment of the first embodiment also has improved aperture ratio and transmittance.

Since there is no end of the opening "op" the pixel region "P" except a pixel region "P" in edges of the display region, there is no electric field by a minor side surface of the opening "op". Accordingly, the liquid crystal molecules at all surface of the pixel region "P" has an uniform arrangement. Moreover, an end along the major axis of the opening in outermost pixel regions (not shown) protrudes beyond the pixel electrode such that a generation of the disclination area can be prevented or minimized.

Referring to FIGS. 7 to 9, a cross-sectional structure of the array substrate for the FFS mode LCD device according to the first embodiment of the present invention is explained. The array substrate for the FFS mode LCD device has a difference in a cross-sectional structure along the line VIII-VIII with compared the array substrate for FFS mode LCD device according to the first embodiment.

In FIGS. 7 to 9, the array substrate for the FFS mode LCD device according to the first embodiment of the present invention includes the gate line 105 and the gate electrode 108 on the substrate 101. The substrate 101 may be transparent. Each of the gate line 105 and the gate electrode 108 is formed of a metallic material having a low resistance property. For example, the metallic material may include one of aluminum (Al), Al alloy (AlNd), copper (Cu), Cu alloy, chrome (Cr) and molybdenum (Mo). The gate electrode 108 is connected to the gate line 105 and disposed in the switching region "TrA".

Although each of the gate line 105 and the gate electrode 108 has a single-layered structure in FIGS. 7 and 9, each of the gate line 105 and the gate electrode 108 may have a double-layered structure. In this case, a lower layer of the double-layered structure may be formed of a metallic material having a low resistance property, such as Al, Al alloy, Cu and Cu alloy, and an upper layer of the double-layered structure may be formed of Mo.

On the gate line 105 and the gate electrode 108, a gate insulating layer 115 is formed of an inorganic insulating material such as silicon oxide ($SiO_2$) and silicon nitride (SiNx). The semiconductor layer 120 including the active layer 120a of intrinsic amorphous silicon and the ohmic contact layer 120b of impurity-doped amorphous silicon is formed on the gate insulating layer 115 and in the switching region "TrA". The source and drain electrodes 133 and 136 spaced apart from each other are formed on the semiconductor layer 120. A portion of the ohmic contact layer 120b is etched such that a portion of the active layer 120a is exposed between the source and drain electrodes 133 and 136.

In addition, the data line 130, which crosses the gate line 105 to define the pixel region "P", is formed on the gate insulating layer 115. The source electrode 133 of the TFT "Tr" is connected to the data line 130.

A semiconductor pattern 121 including first and second patterns 121a and 121b is disposed between the data line 130 and the gate insulating layer 115. The semiconductor pattern 121 is formed of the same material as the semiconductor layer 120. Whether the semiconductor pattern 121 is formed or not is determined by a fabricating method.

Namely, when the semiconductor layer 120, the data line 130 and the source and drain electrodes 133 and 136 are formed by a single mask process, there is the semiconductor pattern 121 under the data line 130, as shown in FIG. 8. However, if the semiconductor layer 120 is formed by a mask process different from a mask process for the data line 130 and the source and drain electrodes 133 and 136, there is no semiconductor pattern 121 under the data line 130.

A first passivation layer 140 covering the data line 130 and the TFT "Tr" is formed of one of an inorganic insulating material and an organic insulating material. The inorganic insulating material includes one of silicon oxide (SiO2) and silicon nitride (SiNx), and the organic insulating material includes one of benzocyclobutene (BCB) and photo-acryl. In FIGS. 7 to 9, since the first passivation layer 140 is formed an inorganic insulating material, the first passivation layer 140 has a step difference. However, when the first passivation layer 140 is formed an organic insulating material, the first passivation layer 140 has a flat top surface. The first passivation layer 140 has a drain contact hole 150 exposing a portion of the drain electrode 136 of the TFT "Tr".

The pixel electrode 155 having a plate shape is formed in each pixel region "P" and on the first passivation layer 140 having the drain contact hole 150. The pixel electrode 155 contacts the drain electrode 136 through the drain contact hole 150 and is formed of a transparent conductive material such as indium-tin-oxide (ITO) and indium-zinc-oxide (IZO).

On the other hand, the pixel electrode 155 may directly contact the drain electrode 136 of the TFT "Tr" and disposed directly on the gate insulating layer 115. In this case, the first passivation layer 140 having the drain contact hole 150 may be omitted.

A second passivation layer 160 is formed on the pixel electrode 155. The second passivation layer 160 is formed of one of the inorganic insulating material and an organic insulating material. The common electrode 170 of the transparent conductive material is formed on the second passivation layer 160 and on an entire surface of the display region of the substrate 101. The common electrode 170 has a plate shape and a plurality of openings "op" spaced apart from each other in each pixel region "P". Each opening "op" has a bar shape and has a major axis along the data line 130. The major length of the opening "op" is greater than that of the pixel electrode 155. Accordingly, a center portion of the opening "op" overlaps the pixel electrode 155, while both ends along the major axis of the opening "op" protrude beyond the pixel electrode 155. In other word, each end along the major axis of the opening "op" is much adjacent to the gate line 105 than the pixel electrode 155.

In the array substrate for the FFS mode LCD device according to the modified embodiment of the first embodiment, the opening "op" extends to run across the adjacent pixel regions "P" along the data line 130. Namely, the opening "op" has a single stripe shape at an entire of the display region. Accordingly, the common electrode is not shown in FIG. 8. In this case, since there is an end along the major axis of the opening in outermost pixel region (not shown), the end along the major axis of the opening in outermost pixel regions (not shown) protrudes beyond the pixel electrode.

There are three openings "op" in each pixel region "P". Moreover, the openings "op" are spaced apart from each other by the same distance. However, to obtain an efficient fringe field, the common electrode 170 may have two to ten openings "op".

In the non-display region at a periphery of the display region, there are gate pad region (not shown) and the data pad region (not shown). In the gate pad region, a gate pad electrode (not shown) connected to the gate line 105 is disposed. In the data pad region, a data pad electrode (not shown) connected to the data line 130 is disposed. In addition, a common pad electrode (not shown) connected to the common electrode 170 for applying a common voltage into the common electrode 170 is formed in the non-display region.

The gate insulating layer 115 and the first and second passivation layers 140 and 160 on the gate pad electrode are removed such that a gate pad contact hole (not shown) exposing the gate pad electrode is formed. The first and second passivation layers 140 and 160 on the data pad electrode are removed such that a data pad contact hole (not shown) exposing the data pad electrode is formed.

In addition, a gate auxiliary pad electrode (not shown) contacting the gate pad electrode through the gate pad contact hole is formed on the second passivation layer 160 and in the gate pad region. A data auxiliary pad electrode (not shown) contacting the data pad electrode through the data pad contact hole is formed on the second passivation layer 160 and in the gate pad region. Each of the gate and data auxiliary pad electrodes is formed of the same material as the common electrode 170. The common pad electrode is disposed in one of the gate pad region and the data pad region. The common pad electrode extends from the common electrode 170 as a line shape.

In an array substrate for an FFS mode LCD device according to a second embodiment of the present invention, there is only difference in a positional relation between an opening in a common electrode and a pixel electrode. Accordingly, an explanation is focused on the differences.

Although not shown, the above array substrate is attached with a color filter substrate including a black matrix and a color filter layer such that an FFS mode LCD device is obtained.

Figure 11:
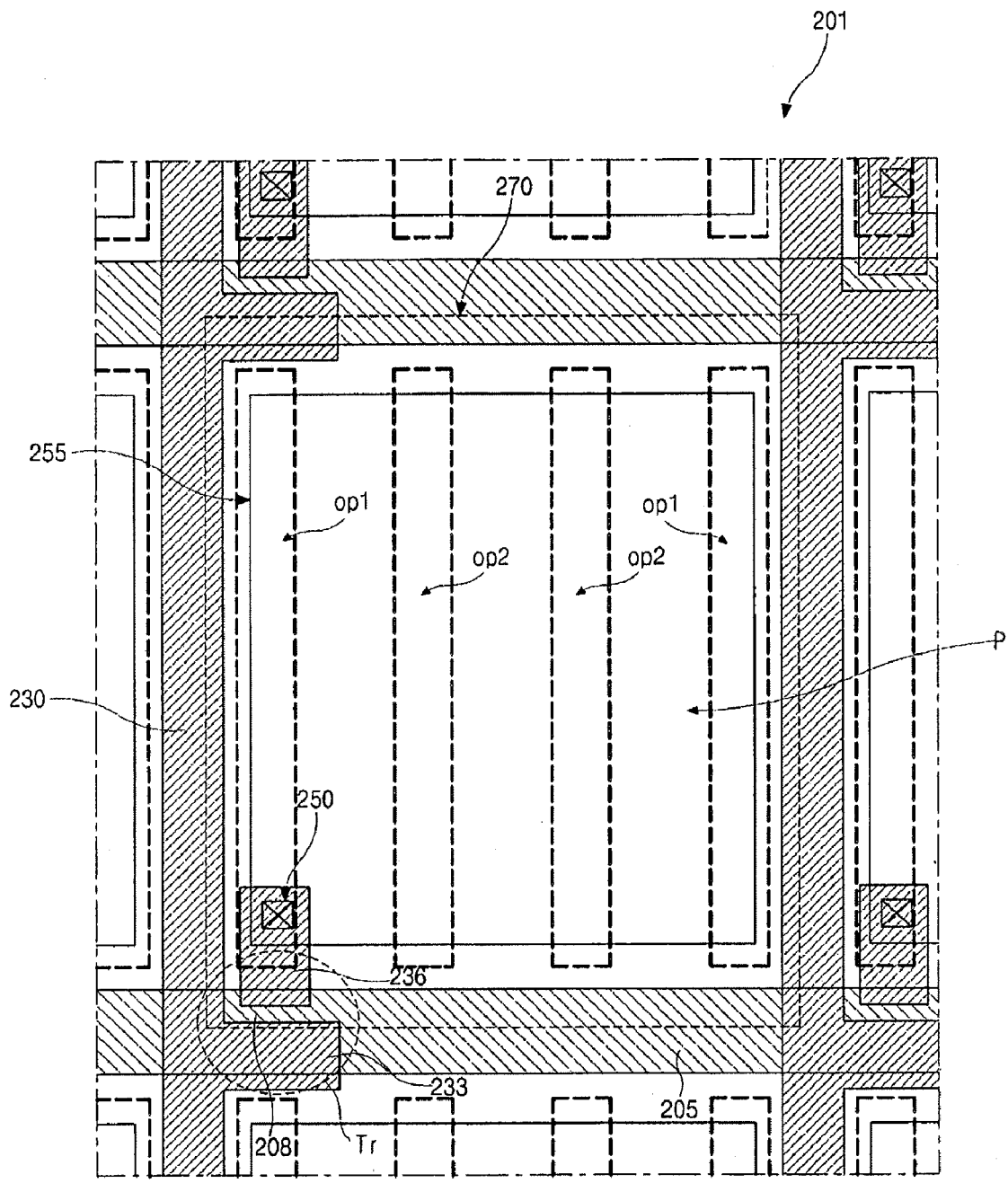
FIG. 11 is a plan view of an array substrate for an FFS mode LCD device according to a second embodiment of the present invention.

FIG. 11 is a plan view of an array substrate for an FFS mode LCD device according to a second embodiment of the present invention. Although only both ends along the major axis of the opening "op" in the common electrode are shown to be positioned outside the pixel electrode in FIG. 6, not only both ends along a major axis of an opening "op" in a common electrode 270 but also an end along a minor axis of an outermost openings "op1" in each pixel region "P" is shown to be positioned outside a pixel electrode 255 in FIG. 11. Namely, the end along the minor axis of the outermost openings "op1" in each pixel region "P" protrudes beyond the pixel electrode 255. Ends of the minor axis of other openings "op2" in center of the pixel region "P" is not protrude the pixel electrode 255 and overlaps the pixel electrode 255.

The reason why the end along the minor axis of the outermost openings "op1" in each pixel region "P" protrudes beyond the pixel electrode 255 is that an uniform fringe field along a center of the pixel region "P" is generated at the outermost opening "op1". As a result, an electric field by a fringe field is not generated or is very weak at the outermost opening "op1".

Figure 12:
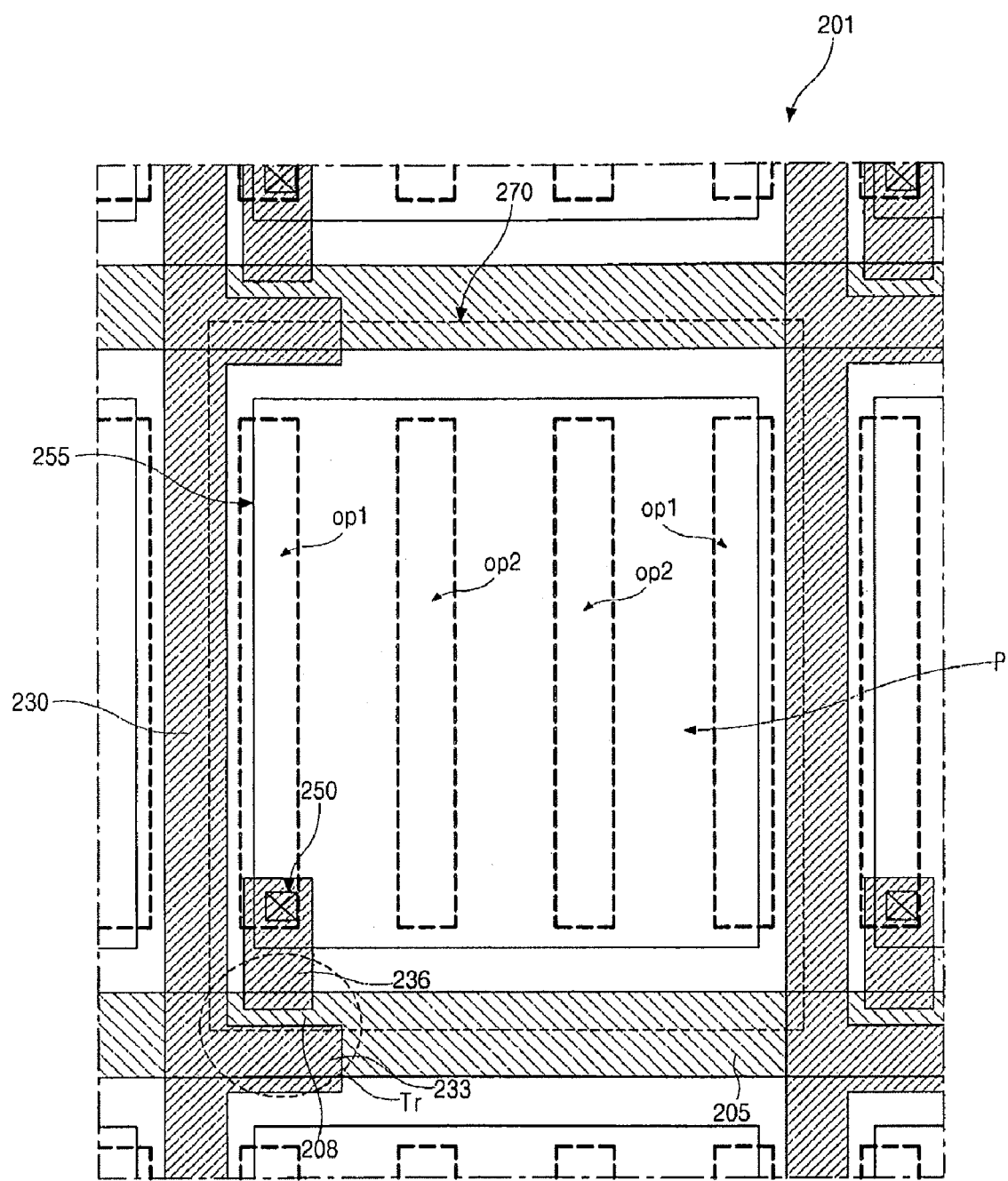
FIG. 12 is a plan view of an array substrate for an FFS mode LCD device according to a modified embodiment of the second embodiment of the present invention.

On the other hand, referring to FIG. 12, which is a plan view of an array substrate for an FFS mode LCD device according to a modified embodiment of the second embodiment of the present invention, both ends along a major axis of the openings "op1" and "op2" in each pixel region "P" overlaps the pixel electrode 255, while an end along a minor axis of the outermost opening "op1" is positioned to be disposed outside of the pixel electrode 255. Namely, each of the openings "op1" and "op2" has a major axial length smaller than the pixel electrode. As a result, the center opening "op2" completely overlap the pixel electrode 255. However, the end along the minor axis of the outermost opening "op1" protrudes beyond the pixel electrode 255.

Similar to the modified embodiment of the first embodiment shown in FIG. 10, in the array substrate for the FFS mode LCD device according to the second embodiment and the array substrate for the FFS mode LCD device according to the modified embodiment of the second embodiment, the openings "op1" and "op2" may run across the pixel regions along each data line 230.

Although not shown, the above array substrate is attached with a color filter substrate including a black matrix and a color filter layer such that an FFS mode LCD device is obtained.

Hereinafter, a fabricating method of the array substrate for the FFS mode LCD device according to the first embodiment is briefly explained with reference to FIGS. 6 to 9. The second embodiment and the modified embodiment of the second embodiment have a difference in a positional relation between the opening of the common electrode and the pixel electrode. Accordingly, the explanation of the fabricating process is focused on the first embodiment. A switching region "TrA" where a TFT "Tr" is formed is defined in each pixel region "P".

First, a first metallic material having a low resistance property is on the substrate 101 to form a first metal layer (not shown). For example, the first metallic material include one of aluminum (Al), Al alloy (AlNd), copper (Cu), Cu alloy, chrome (Cr) and molybdenum (Mo). The first metal layer is patterned by a mask process to form the gate line 105 along a first direction and the gate electrode 108 in the switching region "TrA". The gate electrode 108 is connected to the gate line 105. The mask process includes a step of coating a photoresist (PR) layer on the first metal layer, a step of exposing the PR layer using a mask, a step of developing the exposed PR layer to form a PR pattern, a step of etching the first metal layer using the PR pattern as an etching mask and stripping remained the PR pattern. At the same time, the gate pad electrode (not shown) connected to an end of the gate line 105 is formed in the gate pad region (not shown).

Although the gate line 105 and the gate electrode 108 having a single-layered structure are shown, each of the gate line 105 and the gate electrode 108 may have a double-layered structure. For example, a lower layer of the double-layered structure may be formed of Al alloy, and an upper layer of the double-layered structure may be formed of Mo.

Next, the gate insulating layer 115 is formed on the gate line 105 and the gate electrode 108 by depositing an inorganic insulating material such as silicon oxide ($SiO_2$) and silicon nitride (SiNx). Next, an intrinsic amorphous silicon layer (not shown), an impurity-doped amorphous silicon layer (not shown) and a second metal layer (not shown) are sequentially stacked on the gate insulating layer 115. The second metal layer is formed by depositing one of aluminum (Al), Al alloy (AlNd), copper (Cu) and Cu alloy. Then, a PR layer (not shown) is formed on the second metal layer, and the PR layer is developed by a half-tone exposing method or a refractive exposing method to form first and second PR patterns (not shown) having a difference in a thickness.

Next, the second metal layer exposed by the first and second PR patterns, and the impurity-doped amorphous silicon layer and the intrinsic amorphous silicon layer under the exposed second metal layer are sequentially etched to form the data line 130 along a second direction. The data line 130 crosses the gate line 105 to define the pixel region "P". At the same time, the active layer 120*a*, an ohmic contact pattern (not shown) and a source-drain pattern (not shown) are stacked on the gate insulating layer 115 and in the switching region "TrA". Moreover, the data pad electrode (not shown) connected to an end of the data line 130 is formed in the data pad region (not shown).

Next, an ashing process is performed to remove the second PR pattern having a smaller thickness than the first PR pattern. A center portion of the source-drain pattern is exposed by removing the second PR pattern. The center portion of the source-drain pattern and a portion of the ohmic contact pattern under the center portion of the source-drain pattern are etched to form the source and drain electrodes 133 and 136 and the ohmic contact layer 120*b* under the source and drain electrodes 133 and 136. A portion of the active layer 120*a* is exposed. The gate electrode 108, the gate insulating layer 115, the semiconductor layer 120 including the active layer 120*a* and the ohmic contact layer 120*b*, the source electrode 133 and the drain electrode 136 constitute the TFT "Tr" in the switching region "TrA". Since the semiconductor layer 120 and the source and drain electrodes 133 and 136 are formed by a single mask process, there is the semiconductor pattern 121 including the first and second patterns 121*a* and 121*b*, which are respectively formed of the same material as the active layer 120*a* and the ohmic contact layer 120*b*, under the data line 130 formed of the same material and on the same layer as the source and drain electrodes 133 and 136.

On the other hand, the semiconductor layer 120 may be formed by a mask process different from the source and drain electrodes 133 and 136. Namely, the semiconductor layer 120 and the source and drain electrodes 133 and 136 may be formed by two mask processes. In this case, the intrinsic amorphous silicon layer and the impurity-doped amorphous silicon layer stacked on the gate insulating layer are etched by one mask process to form the active layer 120a and the ohmic contact pattern. Then, the second metal layer is formed on the ohmic contact pattern. Next, the second metal layer is patterned by another mask process to form the data line 130, the source electrode 133 and the drain electrode 136, and a portion of the ohmic contact pattern exposed between the source and drain electrodes 133 and 136 is removed to expose a portion of the active layer 120a and form the ohmic contact layer 120b. In this case, there is no semiconductor pattern under the data line 130.

Next, an inorganic insulating material, such as silicon oxide (SiO2) and silicon nitride (SiNx), is deposited or an organic insulating material, such as benzocyclobutene (BCB) and photo-acryl, is coated on the TFT "Tr" and the data line 130 to form the first passivation layer 140. Then, the first passivation layer 140 is patterned to form the drain contact hole 150 exposing a portion of the drain electrode 136. As mentioned above, the first passivation layer 140 may be omitted.

Next, a transparent conductive material, such as ITO and IZO, is deposited on the first passivation layer 140 including the drain contact hole 150 to form a first transparent conductive material layer. The first transparent conductive material layer is patterned by a mask process to form the pixel electrode 155 having a plate shape and connected to the drain electrode 136 through the drain contact hole 150. If the first passivation layer 140 is omitted, the pixel electrode 155 is disposed directly on the gate insulating layer 115 and directly contacts the drain electrode 136.

Next, an inorganic insulating material, such as silicon oxide (SiO2) and silicon nitride (SiNx), is deposited or an organic insulating material, such as benzocyclobutene (BCB) and photo-acryl, is coated on the pixel electrode 155 to form the second passivation layer 160.

The second passivation layer 160, the first passivation layer 140 and the gate insulating layer 115 in the gate pad region are removed to form the gate pad contact hole (not shown) exposing the gate pad electrode. In addition, the second passivation layer 160 and the first passivation layer 140 in the data pad region are removed to form the data pad contact hole (not shown) exposing the data pad electrode.

Next, a transparent conductive material, such as ITO and IZO, is deposited on the second passivation layer 160 including the gate pad contact hole and the data pad contact hole to form a second transparent conductive material layer. The second transparent conductive material layer is patterned by a mask process to form the common electrode 170 in an entire surface of the display region. The common electrode 170 has a plate shape. At the same time, the gate auxiliary pad electrode (not shown) contacting the gate pad electrode through the gate pad contact hole is formed in the gate pad region, and the data auxiliary pad electrode (not shown) contacting the data pad electrode through the data pad contact hole is formed in the data pad region. The common electrode 170 has openings as shown in FIGS. 5, 9, 10 and 11.

Figure 13:
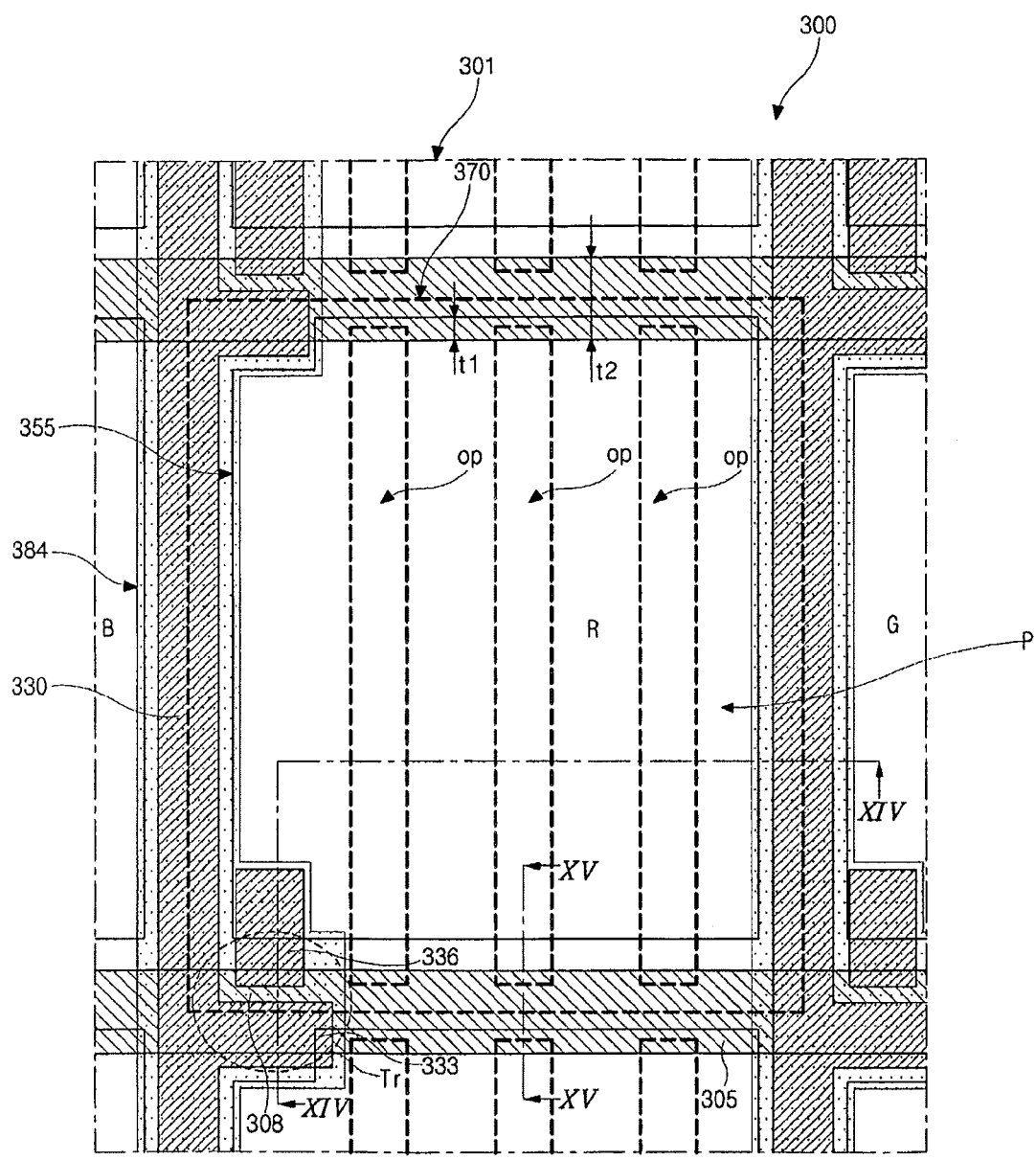
FIG. 13 is a plan view of an FFS mode LCD device according to a third embodiment of the present invention.
Figure 14:
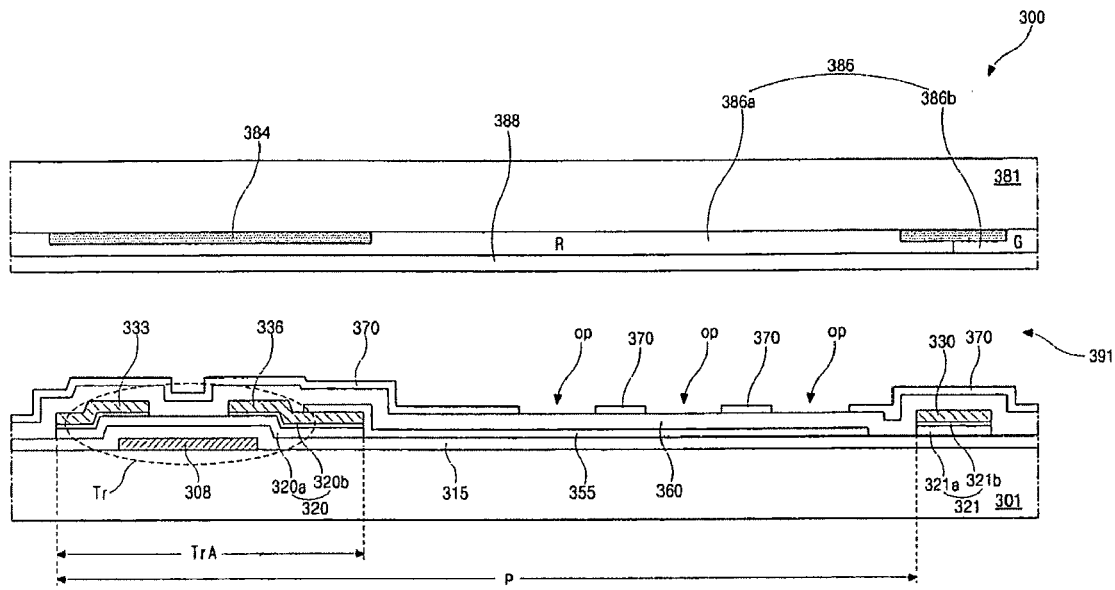
FIG. 14 is a cross-sectional view taken along the line XIV-XIV of FIG. 13.
Figure 15:
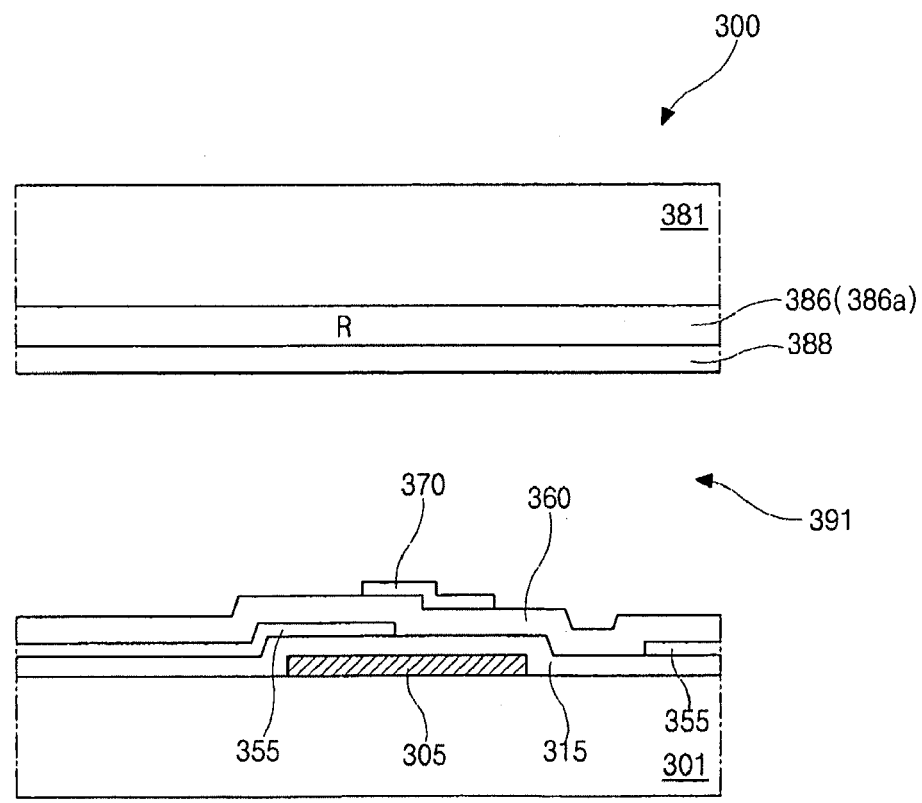
FIG. 15 is a cross-sectional view taken along the line XV-XV of FIG. 13.

FIG. 13 is a plan view of an FFS mode LCD device according to a third embodiment of the present invention, FIG. 14 is a cross-sectional view taken along the line XIV-XIV of FIG. 13, and FIG. 15 is a cross-sectional view taken along the line XV-XV of FIG. 13. For convenience of explanation, a region where a plurality of pixel regions is defined as a display region.

In FIG. 13, an FFS mode LCD device 300 includes a first substrate 301, a second substrate (not shown) facing the first substrate 301 and a liquid crystal layer (not shown) interposed therebetween.

On the first substrate 301, a gate line 305 is formed along a first direction. A data line 330 along a second direction crosses the gate line 305 such that a pixel region "P" is defined.

In the pixel region "P", a TFT "Tr" connected to the gate and data lines 305 and 330 is formed. The TFT "Tr" includes a gate electrode 308, a gate insulating layer (not shown), a semiconductor layer (not shown) including an active layer (not shown) of intrinsic amorphous silicon and an ohmic contact layer (not shown) of impurity-doped amorphous silicon, a source electrode 333 and a drain electrode 336. The source electrode 333 is spaced apart from the drain electrode 336. In FIG. 13, to improve aperture ratio, the gate electrode 308 is a portion of the gate line 305 such that the TFT "Tr" is formed on the gate line 305. However, the gate electrode 305 may protrude from the gate line 305 into the pixel region "P".

A pixel electrode 355 having a plate shape is disposed in the pixel region "P". The pixel electrode 355 is connected to the drain electrode 336 of the TFT "Tr". The pixel electrode 355 overlaps a portion of a previous gate line 305. When the gate line 305 has a second width "t2", the overlapped portion of the pixel electrode 355 and the previous gate line 305 has a first width "t1" with range less than about 50 percentages (%) of the second width "t2". Namely, the second width "t2" is equal to or smaller than a half of the first width "t1". The second width "t2" of the gate line 305 may be about 8 micrometers to about 12 micrometers, and the first width "t1" of the overlapped portion of the pixel electrode 355 and the previous gate line 305 may be about 4 micrometers to about 6 micrometers. The reason why the second width "t2" is equal to or smaller than a half of the first width "t1" is that a distortion in an electric field generated from a coupling problem in adjacent pixel electrodes 305 is to be prevented. In the related art FFS mode LCD device, the pixel electrode is disposed inside the pixel region to prevent a distortion in an electric field generated from a coupling problem in adjacent pixel electrodes. However, by a simulation, it is know that a distortion in an electric field generated from a parasitic capacitance between the overlapped pixel electrode 355 and the overlapped previous gate line 305 or a coupling problem in adjacent pixel electrodes 355 is scarcely generated. Considering the simulation result, in the FFS mode LCD device according to the present invention, the second width "t2" of the overlapped portion between the pixel electrode 355 and the gate line 305 is equal to or smaller than a half of the first width "t1" of the gate line 305.

In addition, a common electrode 370 having a plurality of openings "op" in each pixel region is formed on an entire surface of the first substrate 301. The openings "op" overlap the pixel electrode 355 and has a bar shape. The common electrode 370 corresponding to one pixel region "P" is marked by a dot-line.

The opening "op" has a major axis along the data line 330 and a minor axis along the gate line 305. Both ends along the major axis of the opening "op" overlap a portion of the gate lines 305. Each of the openings "op" has a relatively great major axial length such that the FFS mode LCD device has improved transmittance.

Since the both ends along the major axis of the opening "op" overlap the portion of the gate lines 305, light can not pass the both ends. Accordingly, even if a disclination area is generated at the ends along the major axis of the opening "op", there is no decrease in displaying quality because the disclination area is shield by the gate line 305.

Figure 16:
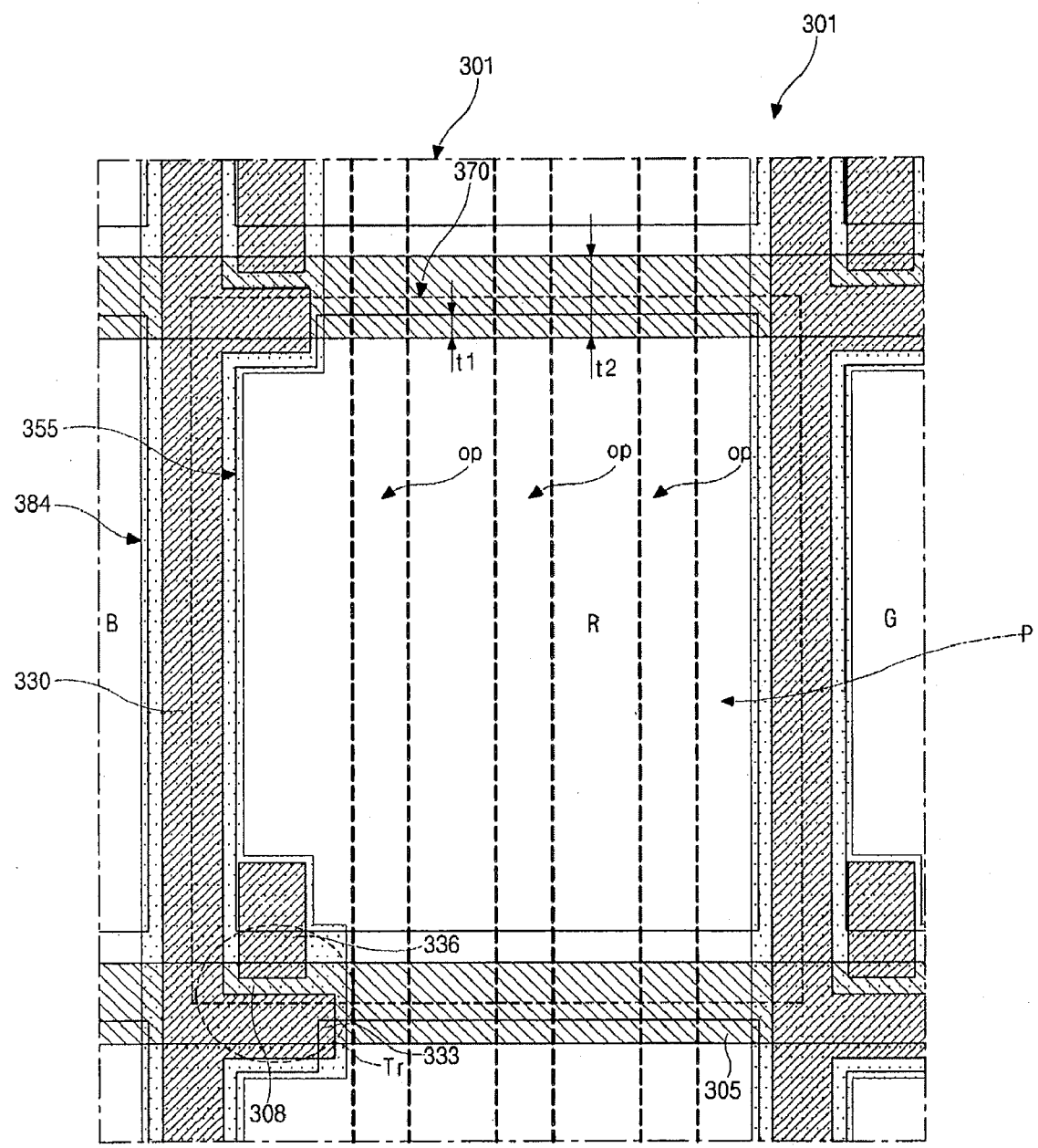
FIG. 16 is a plan view of an FFS mode LCD device according to a modified embodiment of the third embodiment of the present invention.

On the other hand, referring to FIG. 16, which is a plan view of an FFS mode LCD device according to a modified embodiment of the third embodiment of the present invention, each opening "op" runs across pixel regions "P" along a data line 330. Namely, each opening "op" in the common electrode 370 has a single stripe shape through an entire of the display region along the data line 330.

In the FFS mode LCD device in FIG. 16, there is only one end along a major axis of the opening "op" in an outermost pixel region (not shown) of the display region. Accordingly, there is no electric field by a short end side along the major axis of the opening "op" in the central pixel regions "P" except the outermost pixel region (not shown). The liquid crystal molecules in the central pixel region "P" is driven by an electric field generated by a long end side along the major axis of the opening "op" such that the liquid crystal molecules have an uniform and desired arrangement.

As a result, since the disclination area is not generated, the FFS mode LCD device has improved transmittance and aperture ratio. Even if the disclination area is generated, the gate line 305, which overlaps the disclination area, shields the disclination area such that the FFS mode LCD device has improved transmittance and aperture ratio.

Referring again to FIG. 13, although the common electrode 370 including the openings "op" of a bar shape covers an entire of the display region, the common electrode 370 may have another opening (not shown) corresponding to the TFT "Tr" to prevent a parasitic capacitance generated between the gate electrode 308 of the TFT "Tr" and the common electrode 370 when the common electrode 370 overlapping the TFT "Tr". The parasitic capacitance may have a bad effect on a switching operation of the TFT "Tr".

The above first substrate 301 including the gate line 305, the data line 330, the TFT "Tr", the pixel electrode 355 and the common electrode 370 may be referred to as an array substrate.

On the second substrate (not shown) facing the first substrate 301, a color filter layer (not shown), a black matrix 384 and an overcoat layer (not shown) are formed. The color filter layer includes color filter patterns of red, green and blue colors and corresponds to each pixel region "P" of the first substrate 301. The black matrix 384 corresponds to the data line 330 the TFT "Tr". The overcoat layer is formed on the color filter layer. In addition, the liquid crystal layer is disposed between the first substrate 301 and the second substrate.

The black matrix in the related are FFS mode LCD device corresponds to the gate line as well as the data line and the TFT. Namely, the black matrix surrounds the each pixel region. However, since the black matrix 384 in the FFS mode LCD device according to the present invention corresponds to the data line 330 and the TFT "Tr" except the gate line 305, an aperture ratio of the FFS mode LCD device is further improved.

In the FFS mode LCD device according to the present invention, the pixel electrode 355 overlaps the previous gate line 305 with a predetermined width. In addition, the ends along the major axis of the opening "op" in the common electrode 370 also overlap the gate line 305 as shown in FIG. 13. Or, the opening "op" of a single stripe shape runs across the pixel regions "P" along the data line 330 as shown in FIG. 16. As a result, the disclination area at the ends along the major axis of the opening "op" is not generated or is minimized. Accordingly, even if the black matrix 384 does not shield the gate line 305, there is no problem in a displaying quality.

A cross-sectional structure of an FFS mode LCD device according to the third embodiment of the present invention is explained with reference to FIGS. 14 and 15. Since the FFS mode LCD device according to the modified embodiment of the third embodiment of the present invention only has a difference in a positional relation of the gate line and the opening in the common electrode, the explanation is focused on the FFS mode LCD device according to the third embodiment. For convenience of explanation, a region, where the TFT is formed, is defined as a switching region in the pixel region.

In FIGS. 14 and 15, the array substrate for the FFS mode LCD device 300 includes the first substrate 301. The substrate 301 may be transparent. The gate line 305 and the gate electrode 308 are formed on the substrate 301. Each of the gate line 305 and the gate electrode 308 is formed of a metallic material having a low resistance property. For example, the metallic material may include one of aluminum (Al), Al alloy (AlNd), copper (Cu) and Cu alloy. The gate electrode 308 is connected to the gate line 305 and disposed in the switching region "TrA".

Although each of the gate line 305 and the gate electrode 308 has a single-layered structure in FIGS. 14 and 15, each of the gate line 305 and the gate electrode 308 may have a double-layered structure. In this case, a lower layer of the double-layered structure may be formed of a metallic material having a low resistance property, such as Al, Al alloy, Cu and Cu alloy, and an upper layer of the double-layered structure may be formed of Mo.

On the gate line 305 and the gate electrode 308, a gate insulating layer 315 is formed of an inorganic insulating material such as silicon oxide ($SiO_2$) and silicon nitride (SiNx).

The semiconductor layer 320 including the active layer 320a of intrinsic amorphous silicon and the ohmic contact layer 320b of impurity-doped amorphous silicon is formed on the gate insulating layer 315 and in the switching region "TrA". The source and drain electrodes 333 and 336 spaced apart from each other are formed on the semiconductor layer 320. A portion of the ohmic contact layer 320b is etched such that a portion of the active layer 320a is exposed between the source and drain electrodes 333 and 336. Each of the source and drain electrodes 333 and 336 may be formed of a metallic material, such molybdenum (Mo), Chrome (Cr), aluminum (Al), Al alloy (AlNd), copper (Cu) and Cu alloy. The gate electrode 308, the gate insulating layer 315, the semiconductor layer 320, the source electrode 333 and the drain electrode 336 constitute the TFT "Tr" in the switching region "TrA".

In addition, the data line 330, which crosses the gate line 305 to define the pixel region "P", is formed on the gate insulating layer 315. The source electrode 333 of the TFT "Tr" is connected to the data line 330. Each of the data line 330, the source electrode 333 and the drain electrode 336 may have a double-layered structure.

A semiconductor pattern 321 including first and second patterns 321a and 321b is disposed between the data line 330 and the gate insulating layer 315. The semiconductor pattern 321 is formed of the same material as the semiconductor layer 320. Whether the semiconductor pattern 321 is formed or not is determined by a fabricating method.

Namely, when the semiconductor layer 320, the data line 330 and the source and drain electrodes 333 and 336 are formed by a single mask process, there is the semiconductor pattern 321 under the data line 330, as shown in FIG. 14. However, if the semiconductor layer 320 is formed by a mask process different from a mask process for the data line 330 and the source and drain electrodes 333 and 336, there is no semiconductor pattern 321 under the data line 330.

The pixel electrode 355 having a plate shape is formed in each pixel region "P" and on the gate insulating layer 315. The pixel electrode 335 is formed of a transparent conductive material such as indium-tin-oxide (ITO) and indium-zinc-oxide (IZO). The pixel electrode 335 directly contacts the drain electrode 336 and overlaps the previous gate line 305 with a predetermined width. The width of the overlapped portion between the pixel electrode 355 and the gate line 305 may be less than about 50 percentages (%) of a width of the gate line 305.

A passivation layer 160 is formed on the data line 330, the TFT "Tr" and the pixel electrode 355. The passivation layer 160 is formed of an inorganic insulating material, such as silicon oxide (SiO2) and silicon nitride (SiNx), or an organic insulating material, such as benzocyclobutene (BCB) and photo-acryl. In FIGS. 14 to 15, since the passivation layer 160 is formed an inorganic insulating material, the passivation layer 160 has a step difference. However, when the passivation layer 160 is formed an organic insulating material, the passivation layer 160 has a flat top surface.

The common electrode 370 of the transparent conductive material, such as ITO and IZO, is formed on the passivation layer 360 and on an entire surface of the display region of the substrate 301. The common electrode 370 has a plate shape and a plurality of openings "op" spaced apart from each other in each pixel region "P". Each opening "op" has a bar shape and has a major axis along the data line 330. There are three openings "op" in each pixel region "P". Moreover, the openings "op" are spaced apart from each other by the same distance. However, to obtain an efficient fringe field, the common electrode 370 may have two to ten openings "op".

The common electrode 370 covers the TFT "Tr" in FIG. 14. However, a portion of the common electrode 370 corresponding to the TFT "Tr" may be removed such that a portion of the passivation layer 360 is exposed.

On the second substrate 381 facing the first substrate 301, the black matrix 384 is formed to correspond to the data line 330 and the TFT "Tr" on the first substrate 301. The color filter layer 386 including a red color filter pattern 386a, a green color filter pattern 386b and a blue color filter pattern (not shown) and corresponding to each pixel region "P" of the first substrate 301 is formed on the second substrate 381. The overcoat layer 388 of a transparent organic insulating material is formed on the color filter layer 386. The overcoat layer 388 has a flat top surface. The overcoat layer 388 can be omitted.

In addition, the liquid crystal layer 391 is disposed between the first substrate 301 and the second substrate 381.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An array substrate for a fringe field switching mode liquid crystal display device, comprising:
 a plurality of gate lines on a substrate;
 a gate insulating layer on the plurality of gate lines;
 a plurality of data lines on the gate insulating layer and crossing the plurality of gate lines to define a plurality of pixel regions;
 a thin film transistor electrically connected to the gate and data lines and in each pixel region;
 a first passivation layer between the gate insulating layer and the pixel electrode and having a contact hole exposing the portion of the thin film transistor;
 a pixel electrode having a plate shape and in the each pixel region, the pixel electrode connected to a portion of the thin film transistor;
 a second passivation layer on the pixel electrode and over the thin film transistor; and
 a common electrode on the second passivation layer and having a plurality of openings of a bar shape in the each pixel region, each of the openings having a major axis along the data line and a minor axis along the gate line, wherein a center portion of each opening overlaps the pixel electrode, and an end along the minor axis of an outermost opening of the plurality of openings protrudes beyond the pixel electrode, and wherein the pixel electrode on the second insulating layer is connected to the portion of the thin film transistor through the contact hole.

2. The array substrate according to claim 1, wherein the pixel electrode is disposed directly on the gate insulating layer and directly contacts the portion of the thin film transistor.

3. The array substrate according to claim 1, wherein the common electrode further includes another opening corresponding to the thin film transistor.

4. A fringe field switching mode liquid crystal display device, comprising:
 first and second substrate facing each other;
 a plurality of gate lines on the first substrate;
 a gate insulating layer on the plurality of gate lines;
 a plurality of data lines on the gate insulating layer and crossing the plurality of gate lines to define a plurality of pixel regions;
 a thin film transistor electrically connected to the gate and data lines and in each pixel region;
 a first passivation layer between the gate insulating layer and the pixel electrode and having a contact hole exposing the portion of the thin film transistor;
 a pixel electrode having a plate shape and in the each pixel region, the pixel electrode connected to a portion of the thin film transistor;
 a second passivation layer on the pixel electrode and over the thin film transistor;
 a common electrode on the second passivation layer and having a plurality of openings of a bar shape in the each pixel region, each of the openings having a major axis along the data line and a minor axis along the gate line, wherein a center portion of each opening overlaps the pixel electrode, and an end along the minor axis of an outermost opening of the plurality of openings protrudes beyond the pixel electrode;
 a black matrix on the second substrate and surrounding the each pixel region;
 a color filter layer on the second substrate and corresponding to the each pixel region; and
 a liquid crystal layer between the first and second substrates,
 wherein the pixel electrode on the second insulating layer is connected to the portion of the thin film transistor through the contact hole.

5. The array substrate according to claim 4, wherein the pixel electrode is disposed directly on the gate insulating layer and directly contacts the portion of the thin film transistor.

6. The array substrate according to claim 4, wherein the common electrode further includes another opening corresponding to the thin film transistor.

* * * * *